March 28, 1939. F. E. LIVERANCE, JR 2,151,981
MOTOR VEHICLE ENGINE STARTING
Filed July 30, 1934 2 Sheets-Sheet 1
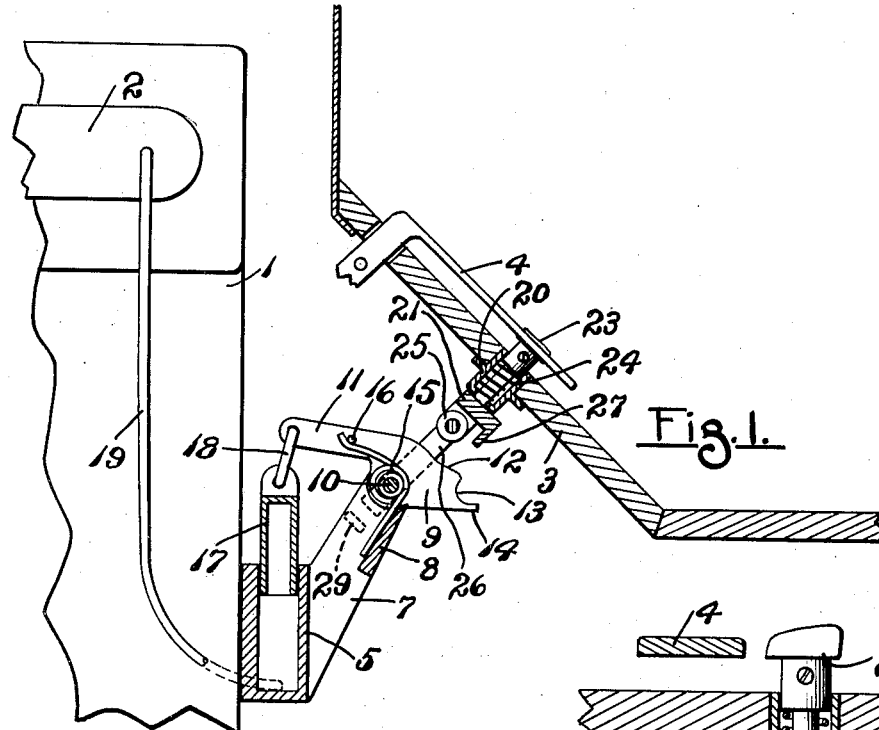
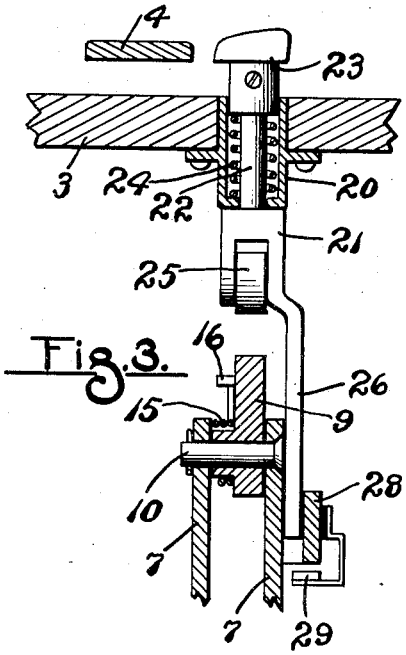
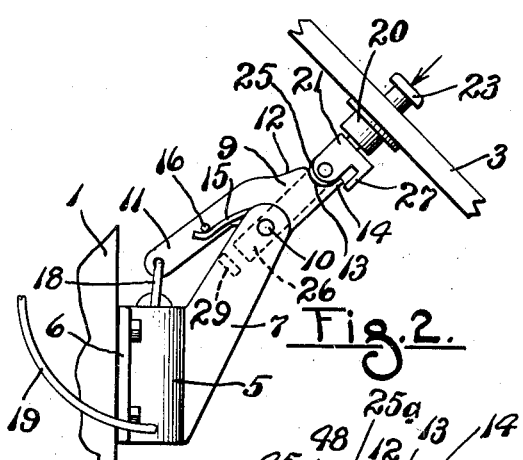
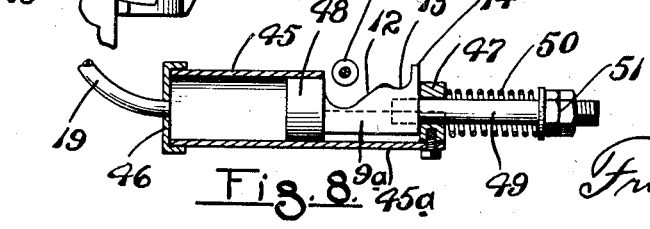
Inventor
Frank E. Liverance, Jr.

March 28, 1939.   F. E. LIVERANCE, JR   2,151,981
MOTOR VEHICLE ENGINE STARTING
Filed July 30, 1934    2 Sheets-Sheet 2

Inventor
Frank E. Liverance, Jr.

Patented Mar. 28, 1939

2,151,981

UNITED STATES PATENT OFFICE 2,151,981

MOTOR VEHICLE ENGINE STARTING

Frank E. Liverance, Jr., Grandville, Mich.

Application July 30, 1934, Serial No. 737,531

13 Claims. (Cl. 123—179)

This invention relates to motor vehicle engine starting.

Internal combustion engines of motor vehicles are now universally started in operation by completing an electric circuit in which a starting motor for the engine is interposed. The starting motor, through suitable gearing connections turns the fly-wheel which is connected to the crank shaft of the engine thereby reciprocating the pistons. Fuel is drawn into the cylinders and in a short time the fuel is ignited and the engine starts to operate under its own power.

To complete the electric circuit for the starting motor it has been common to utilize a foot operated push member mounted adjacent the floorboard of the front or driving compartment of the motor vehicle. A downward pressure on such starting member serves to complete the circuit whereby the electric motor is started in operation. In some cases the downward movement of the foot operated starting member is utilized to place into mesh a pinion on the shaft of the starting motor with a gear on the fly-wheel of the engine. In other cases the rotation of the motor automatically throws such pinion into mesh with the fly-wheel gear.

It is desirable, particularly in cool or cold weather, that the fuel mixture going to the cylinders shall be of a sufficient volume to insure its igniting so that there shall be quick starting. This can be taken care of, and has been in many cases, by operating a throttle lever mounted adjacent the center of the steering wheel to open the throttle of the engine carburetor a desired amount.

The foot operated starting member when used, or in other cases a member to be pushed in by the hand mounted on the dash of the motor vehicle, is located so that it will not be accidentally or inadvertently operated when the engine is running, as it would cause a gear clash between the pinion on the starting motor shaft and the fly-wheel gear. In numerous cases, particularly with modern engines which are nearly noiseless in operation when idling, the driver of the car, thinking that the engine is not in operation, may operate the foot or hand operated starting member with a resultant gear clash and possible damage to the teeth of the fly-wheel gear.

The present invention has for one of its objects and purposes the provision of means associated with the foot operated starting member, or with a hand operated starting member quite as well, whereby when the engine is started and is running in good order, such manually operable starting device is rendered inoperative and cannot be moved sufficiently to close the starting motor circuit. Because of this it is not only permissible but it is desirable to mount the accelerator pedal, which controls the volume of fuel mixture and is foot operated, closely adjacent to the foot operated starting member for the starting motor so that the foot of the driver may simultaneously engage both, depressing the accelerator simultaneously with the depression of the starting member, thereby insuring a desired volume of fuel mixture which otherwise would have to be attained by a separate operation.

A further object of the invention is to provide a simple means for holding the physically operated starter member against depression during the time that the engine is running whereby such starter member, conveniently located closely adjacent the accelerator pedal, serves as a foot rest for the foot which depresses the said accelerator pedal, it being understood that in the ordinary driving of a motor vehicle the speed of travel and other functions dependent upon the fuel supply furnished to the engine cylinders are controlled through foot operation of such accelerator pedal. The invention may be used either in association with the accelerator pedal as described or separate therefrom though, preferably, in closely located relation thereto to serve as a foot rest for the foot-operating the accelerator pedal after the engine has started. In the case where it is not used in such association with the accelerator pedal there will be an insurance against any closing of the starting motor circuit while the engine is running and thus prevent undesirable gear clashing or connecting of the pinion of the shaft of the starting motor with the fly-wheel gear. It will also serve, with the construction which has been devised, to automatically warn the driver when the engine has started so that depression of the starting member after the engine is in operation may not be continued; and in some cases may serve to automatically break the starting motor circuit when the engine has started and after it is in operation.

These and many other objects and purposes will appear and be understood from the following description, taken in connection with the accompanying drawings, in which, Fig. 1 is a fragmentary side elevation, partly in section, showing the installation of the invention in conjunction with a motor vehicle engine and with the parts occupying the position that they do when the engine is at rest.

Fig. 2 is a similar side elevation showing the position of the parts when the engine is running.

Fig. 3 is a fragmentary central section and elevation somewhat enlarged in a plane at right angles to the plane of the section shown in Fig. 1.

Fig. 8 illustrates a still further form of construction embodying the invention.

Like reference characters refer to like parts in the different figures of the drawings.

Figure 4:
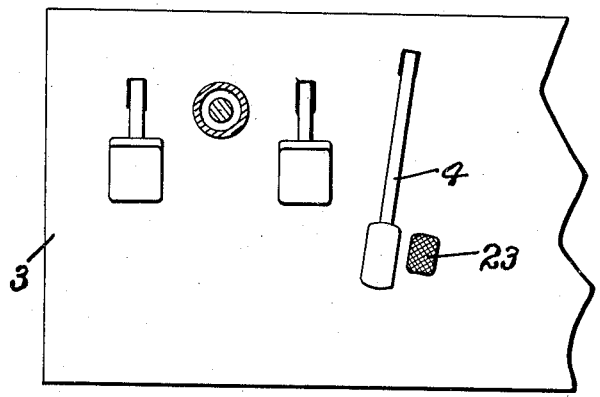
Fig. 4 is a fragmentary plan view of the inclined foot board of the driving compartment of a motor vehicle showing the closely adjacent positions of the accelerator pedal and the upper end of the starter member.

In the construction shown in Fig. 1, the engine, which is an internal combustion engine, is illustrated fragmentarily at 1 as having an intake manifold 2 through which the fuel mixture passes from the carburetor to the engine cylinders. The engine is located ahead of the front driving compartment of the automobile and the forward inclined foot board 3, such as is common in such driving compartments, over which an accelerator pedal 4 is mounted to be engaged and depressed by the foot of the driver to control the quantity of fuel mixture going to the engine cylinders. This construction is very old and well known and the specific connections between the accelerator pedal and the carbureter need not be illustrated or described.

With my invention there is attached, to a suitable support, in this case the rear side of the engine, a cylinder 5 having laterally extending flanges 6 (Fig. 2) through which suitable screws may pass to thread into the engine block. Integral with the cylinder 5 are two upwardly and rearwardly extending spaced apart arms 7 preferably connected adjacent their upper end and at their rear edges by a cross bar 8.

At the upper end of and between the arms 7 an irregularly shaped member 9 is pivotally mounted on a pivot pin 10 which extends through the same and through said arms. The member 9 has an arm 11 extending therefrom over the upper end of the cylinder 5. At the upper edge of the member 9 there is an inclined surface 12 leading to a concaved recess 13 which is directly adjacent to a projecting finger 14 as shown, the finger 14 in Fig. 1 extending substantially in a direction opposite the arm 11. Member 9 is normally movable in a clockwise direction by a coiled spring 15 located around the pivot pin 10, one end portion of which engages with a pin 16 on the arm 11 while the other end portion bears against the inner side of the cross member 8 (Fig. 1). The upper edge of the cross member 8 serves as a stop to limit the turning movement of the member 9 in a clockwise direction.

A piston 17, preferably lightened by coring out the interior portion, is connected at its upper end by means of a suitable link 18 with the end of the arm 11. The piston 17 enters the cylinder 5 at the upper end thereof. A tube 19 connects the lower end of the cylinder 5 with the intake manifold 2, whereby if the engine has started and a lowering of pressure below atmospheric pressure has occurred in the manifold 2, the atmospheric pressure operating against the piston moves the same downwardly and turns the member 9 in a counterclockwise direction or to the position shown in Fig. 2. The parts are held in such position during the engine operation so long as the suction developed in the engine manifold is of a sufficient degree that the air pressure acting upon the piston 17 is sufficient to overcome the spring 15.

A foot operated starter member is shown as mounted on the inclined footboard 3. In the construction shown there is a housing 20 below which is located a member 21 of the form shown in Figs. 1 and 3, with a rod 22 extending from the upper end of the member 21 through the housing 20. At the upper end of the rod a head 23 is adjustably mounted, there being a coiled spring 24 around the rod 22 between the lower end of head 23 and the bottom of the housing 20. The spring serves to normally elevate the parts to the position shown in Figs. 1 and 3, but may be overcome by foot pressure so as to move the parts in a downward direction.

The member 21 is divided or bifurcated and carries a roller 25 located so as to be brought against the upper edge of the member 9 when the starter member is pushed downwardly and inwardly. One side of the bifurcated member 20 is offset laterally, as shown in Fig. 3, and extended downwardly and inwardly in an elongated finger 26. Also at another side of the member 21 a short downwardly and inwardly extended finger 27 is provided (Figs. 1 and 2). The elongated finger 26 may be guided through a guide 28 at one side of one of the arms 7 (Fig. 3) so as to come into contact with a contact member 29 in the starting motor circuit and complete the circuit through grounding the same, the contact 29 being connected with the side of the circuit in which the motor is located and which is connected to the usual electric battery present in motor vehicles. Of course the switch closing for the electric starting motor may be provided in a great many ways and the construction shown in Fig. 3 is illustrative of one form only.

With the engine at rest and the parts in the position shown in Fig. 1, when the engine is to be started the foot of the operator bearing upon the head 23 may be pressed downwardly to overcome spring 24. At the same time the foot of the operator may bear upon the accelerator pedal 4 and depress it simultaneously with the depression of the head 23 of the starter member. There is sufficient space to permit the downward movement of the starter member or until the roller 25 comes against the upper edge of the member 9 at or before which time the starting motor circuit will be completed.

As soon as the engine starts under its own power the suction developed in the manifold 2 carried to the cylinder 5 through the tube 19, tends to cause a movement of the parts to the position shown in Fig. 2. The inclined upper edge 12 of the member 19 will come against the roller 25 and tend to act to move the same out of the path of movement of the member 9, and there will be a warning transmitted to the operator that the engine has started, whereupon he releases pressure against head 23 of the starter member which returns to its upper position under the influence of spring 24. This permits the member 9 to turn to the position shown in Fig. 2 whereupon any subsequent downward pressure of the foot of the operator upon the head 23 seats the roller 25 in the recess 13. When the roller is thus seated in the recess 13 the finger 27 overlaps the upper end of the finger 14 as shown in Fig. 2. It is also evident that the finger 14 engaging against the side of the roller 25 operates as a stop to limit the counterclockwise movement of the member 9.

If the suction of the intake manifold was of a uniform continuous character it alone would serve to maintain the member 9 in the position shown in Fig. 2 after the engine is started. However, the degree of engine suction is variable and under certain conditions, particularly where the accelerator is heavily depressed while the motor vehicle is moving slowly, as up a hill, the vacuum produced in the manifold 2 diminishes almost if not entirely to the vanishing point so that the spring 15 could move the parts back to the initial position shown in Fig. 1 even though the engine was operating. The heavy depression of the accelerator naturally causes the driver to likewise push upon the upper end of the head 23 so as to seat the roller 25 in the depression 13. Not only must the spring 15 have overcome the foot pressure upon the head 23 so as to lift the roller 25 over the hump between said depression 13 and the inclined edge 12 of the member 9, but in addition the cooperative positions of the fingers 14 and 27 as shown in Fig. 2 insures against return of the member 9 to its original position even though the suction in the manifold 2 very substantially diminishes, or in fact entirely disappears.

Figure 5:
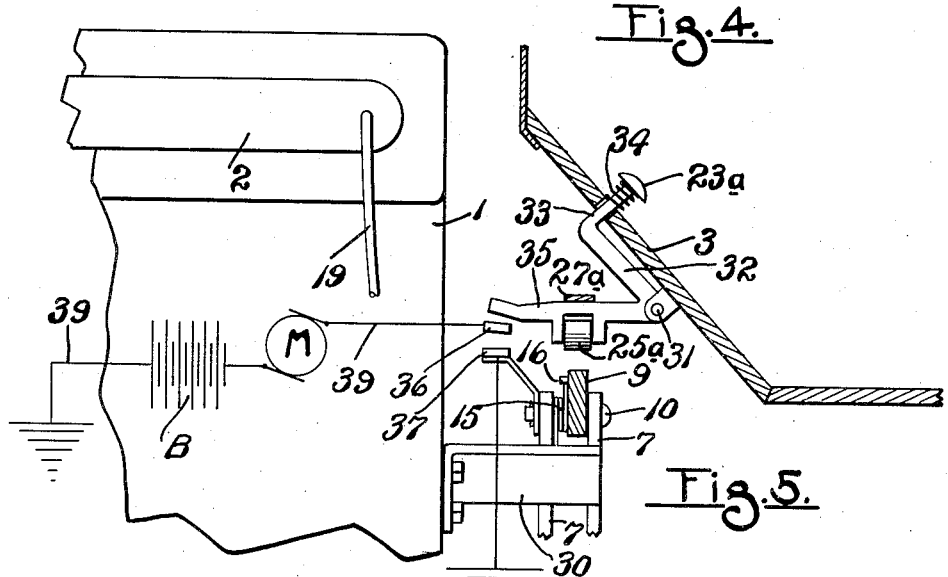
Fig. 5 is a fragmentary section and elevation showing a modified form of structure and illustrating diagrammatically the electric circuit for the starting motor.
Figures 6, 7:
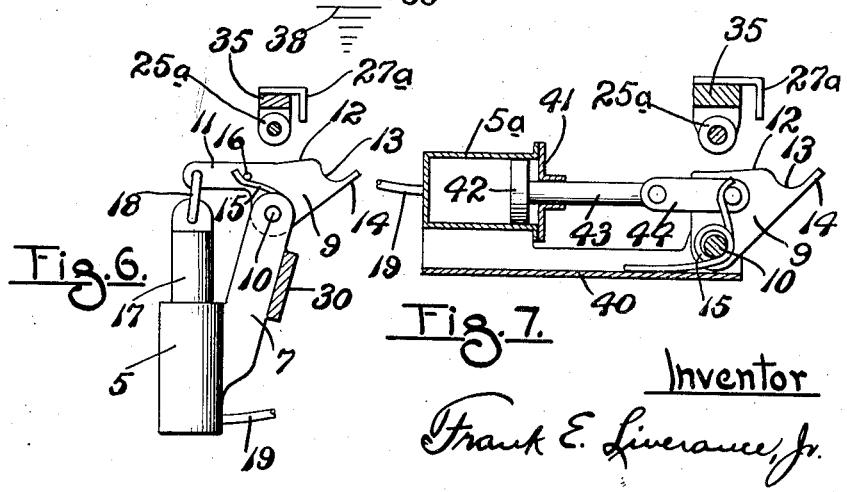
Fig. 6 is a front elevation and partial section of the structure shown in Fig. 5.
Fig. 7 illustrates a further modified form of construction.

In Figs. 5 and 6 a different form of installation is shown equivalent to that shown in Fig. 1. In Fig. 1 the cylinder 5 and the arms 7 extend to the rear back of the engine. In Figs. 5 and 6 the same are located transversely to the length of the engine and back thereof, supported by a bracket 30 which may be formed integral with the arms 7 and extend across the same substantially in the place of the cross member 8 shown in Fig. 1. The starting member is of a different form comprising substantially a bell crank lever pivotally mounted at 31, having one arm 32 turned at right angles to provide a part 33 which passes through the floor board 3 terminating in a head 23a, between which and the floor board a coiled lifting spring 34 is mounted. The other arm 35 of the bell crank extends transversely across and above the irregular shaped member 9 and carries a roller 25a over the member 9 and also a finger 27a to serve the same purposes and functions as the finger 27 in the first described structure.

Depression of the starter member by pressing upon the head 23a turns the arm 35 in a downward direction so as to bring two switch contacts 36 and 37 together completing the circuit which is diagrammatically illustrated in Fig. 5, with one of the contacts 37 indicated as grounded at 38 and with a circuit wire 39, in which the motor M and the battery B are interposed, connected at one end to the other contact 36 and grounded at its opposite end. The same completion of the circuit when the parts are in the position shown in Figs. 5 and 6 and the impossibility of completing the circuit when the engine suction has drawn the piston 17 downwardly into the cylinder 5 are attained together with the holding of the member 9 in the position to which it has been turned by roller 25a seating in recess 13 and fingers 27a and 14 operatively engaging even though engine suction should fail as when the motor vehicle is going up hill or is otherwise operating under heavy load.

In Fig. 7 an equivalent structure for what is shown in Fig. 6 is shown. At one end of a horizontal base support 40 a cylinder 5a is securely mounted to which the tube 19 leading to the manifold 2 is connected. The open end of the cylinder is closed by a cover 14a. A piston 42 within the cylinder has a rod 43 passing through a bearing formed centrally on the cover 41. The piston rod is connected by links 44 with a member 9 similar in all respects to that previously described except the arm 11 is eliminated. The member 9 is pivoted on the pivot pin 10 at the end of the base support 40 opposite the cylinder 5a. Using the same switch closing starter member construction as illustrated in Fig. 5, roller 25a is free to move downwardly and thus permit the circuit switch to be closed. When the engine has started and vacuum has developed in the manifold 2, piston 42 is moved to the left turning the member 9a about its pivot, whereupon the roller 25 must be elevated and will enter the recess 13 while the finger 27a passes at its lower end slightly below the upper end of the finger 14.

In Figure 8 a further form of construction embodying the invention is shown. A cylindrical tube 45 may be closed at one end by a cap 46 soldered or otherwise permanently secured thereto. The opposite end portion of the tube is cut away leaving an extension 45a at its lower side, at the end of which a collar 43 is secured, as by screws as shown.

A member having a piston portion 48, integral with which a part 9a, is mounted so that the piston portion is received within the cylinder 45 and the part 9a normally extends outwardly from the cylinder. It, like the member 9, previously described, is formed with an inclined surface 12, a recess 13, with a hump between the incline 12 and the recesses and an upstanding stop finger 14. A rod 49 passes freely through the collar 47 and is threaded into the end of the member 9a, or otherwise secured thereto, around which is a light coiled spring 50. The outer end of the rod is threaded to receive lock nuts 51 by means of which the tension of the spring is adjustable.

In starting the engine, the starter member, which is of the type shown in Fig. 5, on depression closes a switch and the roller 25a has sufficient space to move between the inclined edge surface 12 and the adjacent end of the piston portion 48. On development of suction within the engine, the piston 48 is moved to the left and the roller 25 rides up the incline 12 until received in the recess 13, the finger 14 coming against the roller and stopping further movement of the piston and connected parts. The spring 50 is compressed so that when free to do so it can return the parts to the position shown in Fig. 8; except of course when the roller 25 is pressed firmly into the recess 13 and/or the finger 27a engaged with the finger 14 as previously described.

The constructions described are of a relatively simple character. The starter button or head is free for movement when the engine is not running and when it is necessary to complete the starting motor circuit. It is at once rendered inoperative and is held against movement as soon as the engine starts and is running under its own power and thereafter may serve as a foot rest closely adjacent to and in association with the accelerator pedal but independent of any operative connection thereto.

The constructions devised are particularly desirable in operation when used with and mounted adjacent the accelerator pedal. However, the breaking of the electric circuit of the starting motor as soon as the motor has performed its function and the insurance against accidental or other closing of said circuit while the engine is running is of value irrespective of whether the further function of using the manually operable starting member as a foot rest adjacent the starter pedal is made use of. The immediate breaking of the starting motor circuit or at least a clear warning and indication to the operator that the engine has started is of value irrespective of the accelerator pedal operation. The invention therefore is not necessarily in every case used in association with the accelerator pedal and is not to be restricted thereto other than as necessitated by the terms of the appended claims defining the invention.

I claim:

1. Starting mechanism for internal combustion engines comprising, an electric starting motor, circuit and switch therefor, a movable member for closing said switch, means occupying one position when the engine is at rest, suction means operated by the engine for moving said means to another position when the engine is running and cooperating means on said member and said first mentioned means engaging against each other when the engine is started and the suction thereof begins to operate tending to move said member away from switch closing position.

2. Starting mechanism for internal combustion engines comprising, an electric starting motor, an electric circuit therefor, a switch for closing said circuit, movable means for closing the circuit, a member occupying one position when the engine is at rest, means under control of suction from the engine for moving said member to another position when the engine is running and into the path of movement of the movable switch closing means, and means for holding said member in switch closing prevention position, independent of the suction controlled means.

3. Starting mechanism for internal combustion engines comprising an electric starting motor, an electric circuit therefor, a switch for closing said circuit, movable means for closing the switch, a member occupying one position when the engine is at rest, means under control of suction from the engine for moving said member to another position and into the path of movement of the movable switch closing means when the engine is running, said member having a recess to be engaged by said movable switch closing means to thereby hold the member against return to its first position until the movable switch closing means is released from said recess.

4. Starting mechanism for internal combustion engines comprising, an electric starting motor, an electric circuit therefor, a switch for closing said circuit, manually operable means for closing the switch, means under control of suction of the engine for holding the switch closing means against movement to close the switch when the engine is running, and means on said last mentioned means adapted to be brought to bear against said manually operable switch closing means when the engine starts to thereby tend to move said switch closing means to circuit breaking position.

5. Starting mechanism for internal combustion engines comprising, an electric starting motor, circuit therefor and closing switch for the circuit, movable means for closing the switch, a movable member mounted adjacent said switch closing means, means under control of the suction of the engine for moving said member when the engine starts, means on said member engaging with the switch closing means when thus moved to render the switch closing means inoperative, said member having a recess therein adapted to be engaged by the switch closing means, and additional interengaging means on the switch closing means and said movable member to render the switch closing means inoperative when the engine is running at times when the engine motor substantially diminishes.

6. Starting mechanism for internal combustion engines comprising, an electric starting motor, an electric circuit therefor, a switch for closing said circuit, movable means for closing the switch, means under control of suction of the engine engaging with the switch closing means and tending to unclose the switch after the engine has started and moved into the path of movement of the switch closing means to prevent switch closing after the engine has started and while the engine suction is maintained, and movable means to engage said suction controlled means to hold it in switch prevention closing position at times when the engine suction diminishes.

7. Starting mechanism for internal combustion engines comprising an electric starting motor, an electric circuit therefor, a switch for closing said circuit, movable means for closing the switch, a movable member positioned to permit movement of said switch closing means to close the switch when the engine is at rest, means for moving said member after the engine has started into a position to hold the switch closing means against movement, said movable member having a projecting finger thereon, and a cooperating finger on the switch closing means for the purposes described.

8. Starting mechanism for internal combustion engines comprising an electric starting motor, an electric circuit therefor, a switch for closing said circuit, movable means for closing the switch, a cylinder, a piston within the cylinder, a tube connecting the cylinder with the engine manifold, a movably mounted member connected with said piston, said member when the piston is moved through suction in the engine manifold being moved to lie in the path of movement of the movable switch closing means, said member having a projecting finger, and a cooperating finger on the movable switch closing means as and for the purposes described.

9. Starting mechanism for internal combustion engines comprising, an electric starting motor, circuit therefor and a closing switch for the circuit, a movable element for closing the switch, and an engine operated member occupying a position when the engine is at rest whereby said movable element may be moved to close the switch and movable to another position by engine operation when the engine is running, said member having an inclined surface to engage against said movable element upon the engine starting tending to lift the movable element and giving warning thereby that the engine has started.

10. Starting mechanism for internal combustion engines comprising, an electric starting motor and electric circuit therefor, a switch for closing said circuit, manually operable means for closing the switch, means under control of suction of the engine for holding the switch closing means against movement to close the switch when the engine is running, said last mentioned means comprising a member movable underneath the switch closing means through engine suction and said member and switch closing means having cooperating engaging parts whereby the switch closing means is tended to be moved to upper inoperative position when said member is moved through suction of the engine to the position for holding the switch against depression.

11. Starting mechanism for internal combustion engines comprising, an electric starting motor, an electric circuit therefor, a switch for closing said circuit, movable means for closing the switch, a movable member normally positioned to permit the operation of the switch closing means when the engine is at rest, engine operated means for moving the movable member underneath the switch closing means when the engine starts in operation, said movable member having an edge thereof brought under and against the switch closing means on engine operation thereof acting to tend to move said switch closing means to switch opening position.

12. Starting mechanism for internal combustion engines comprising, an electric starting motor, an electric circuit therefor, a switch for closing said circuit, manually operable movable means for closing the circuit, means under control of suction from the engine for holding said manually operable switch closing means against movement to close the switch when the engine is running, and means operable through attempted manual operation of said switch closing means to close the switch for controlling said suction controlled means in switch closing prevention position on failure of engine suction to do so.

13. Starting mechanism for internal combustion engines comprising, an electric starting motor, an electric circuit therefor, a manually operable switch for closing said circuit, means under control of suction from the engine for holding said switch from manual operation to close the same when the engine is running, and manually operable means for holding said suction controlled means in switch closing prevention position on failure of engine suction to do so.

FRANK E. LIVERANCE, Jr.